United States Patent
Walid et al.

(10) Patent No.: US 10,020,918 B2
(45) Date of Patent: Jul. 10, 2018

(54) FAST COUPLED RETRANSMISSION FOR MULTIPATH COMMUNICATIONS

(71) Applicants: Anwar I. Walid, Watchburg, NJ (US); Jae Hyun Hwang, Seoul (KR)

(72) Inventors: Anwar I. Walid, Watchburg, NJ (US); Jae Hyun Hwang, Seoul (KR)

(73) Assignees: Alcatel Lucent, Boulogne-Billancourt (FR); Alcatel-Lucent USA Inc., Murray Hill, NJ (US)

( * ) Notice: Subject to any disclaimer, the term of this patent is extended or adjusted under 35 U.S.C. 154(b) by 165 days.

(21) Appl. No.: 14/980,834

(22) Filed: Dec. 28, 2015

(65) Prior Publication Data
US 2017/0187497 A1    Jun. 29, 2017

(51) Int. Cl.
| | | |
|---|---|---|
| *H04L 1/18* | (2006.01) | |
| *H04L 29/06* | (2006.01) | |
| *H04L 5/00* | (2006.01) | |
| *H04L 12/26* | (2006.01) | |
| *H04L 12/707* | (2013.01) | |

(52) U.S. Cl.
CPC .......... *H04L 1/1858* (2013.01); *H04L 5/0055* (2013.01); *H04L 69/16* (2013.01); *H04L 43/08* (2013.01); *H04L 45/24* (2013.01)

(58) Field of Classification Search
CPC ..... H04L 1/1858; H04L 5/0055; H04L 45/24; H04L 69/16; H04L 43/08
USPC .......................................... 714/748, 749, 712
See application file for complete search history.

(56) References Cited

U.S. PATENT DOCUMENTS

| | | | |
|---|---|---|---|
| 7,929,527 B2 | 4/2011 | Ramakrishnan et al. | |
| 8,780,693 B2* | 7/2014 | Kim | G06F 15/16 370/216 |
| 9,350,672 B2* | 5/2016 | Patwardhan | H04L 47/193 |
| 9,402,199 B2* | 7/2016 | Amini | H04W 28/0215 |
| 9,439,099 B2* | 9/2016 | Emmanuel | H04W 28/0215 |
| 9,503,223 B2* | 11/2016 | Wu | H04L 1/1825 |
| 2012/0226802 A1* | 9/2012 | Wu | H04L 1/1825 709/224 |
| 2013/0031256 A1 | 1/2013 | Hampel | |
| 2013/0077501 A1 | 3/2013 | Krishnanwamy et al. | |
| 2013/0114481 A1* | 5/2013 | Kim | G06F 15/16 370/310 |

(Continued)

FOREIGN PATENT DOCUMENTS

WO    WO 2012/119214 A1    9/2012

OTHER PUBLICATIONS

Lim et al., Cross-Layer Path Management in Multi-path Transport Protocol for Mobile Devices, 2014, IEEE, pp. 1-9.*

(Continued)

*Primary Examiner* — John J Tabone, Jr.
(74) *Attorney, Agent, or Firm* — Tong, Rea, Bentley & Kim, LLC

(57) ABSTRACT

The present disclosure generally discloses various mechanisms for supporting multipath communications, including mechanisms for supporting retransmissions for multipath communications. The mechanisms for supporting retransmission for multipath communications may be provided within the context of multipath transport connections, such as Multipath Transmission Control Protocol (MPTCP) connections. The mechanisms for supporting retransmission for multipath communications may support retransmission of lost or delayed packets of a multipath transport connection in a manner tending to avoid a timeout of the multipath transport connection.

21 Claims, 7 Drawing Sheets

(56) References Cited

U.S. PATENT DOCUMENTS

| | | | | |
|---|---|---|---|---|
| 2014/0064082 | A1 | 3/2014 | Yeung et al. | |
| 2015/0103663 | A1* | 4/2015 | Amini | H04W 28/0215 370/235 |
| 2015/0103730 | A1* | 4/2015 | Emmanuel | H04W 28/0215 370/315 |
| 2015/0263959 | A1* | 9/2015 | Patwardhan | H04L 47/193 370/235 |
| 2016/0330651 | A1* | 11/2016 | Amini | H04W 28/0215 |
| 2016/0337230 | A1* | 11/2016 | Emmanuel | H04W 28/0215 |
| 2017/0005705 | A1* | 1/2017 | Casselman | H04B 7/024 |
| 2017/0041836 | A1* | 2/2017 | Huang | H04L 29/06 |
| 2017/0187629 | A1* | 6/2017 | Shalev | H04L 43/0823 |

OTHER PUBLICATIONS

A. Ford, C. Raiciu, M. Handley, and O. Bonaventure, "TCP Extensions for Multipath Operation with Multiple Addresses," RFC 6824, IETF, Jan. 2013.

C. Raiciu, S. Barre, C. Pluntke, A. Greehalgh, D. Wischik, and M. Handley, "Improving Datacenter Performance and Robustness with Multipath TCP," in Proc. ACM SIGCOMM, 2011.

S. Deng, R. Netravali, A. Sivaraman, and H. Balakrishnan, "WiFi, LTE, or Both? Measuring Multi-Homed Wireless Internet Performance," in Proc. ACM IMC, 2014.

Yanpei Chen, et al, "Understanding TCP incast throughput collapse in datacenter networks," in Proc. the 1st ACM workshop on Research on enterprise networking, pp. 73-82, 2009.

M. Al-Fares, S. Radhakrishnan, B. Raghavan, N. Huang, and A. Vandat, "Hedera: Dynamic Flow Scheduling for Data Center Networks," in Proc. USENIX NSDI, 2010.

C. Raiciu, C. Paasch, S. Barre, A. Ford, M. Honda, F. Duchene, O. Bonaventure, and M. Handley, "How Hard Can It Be? Designing and Implementing a Deployable Multipath TCP," in Proc. USENIX NSDI, 2012.

C. Paasch, S. Barre, and et al., "Multipath TCP in the Linux Kernel." [Online]. Available: http://www.multipath-tcp.org, downloaded Dec. 28, 2015.

* cited by examiner

FIG. 6

PSEUDOCODE
600

*mptcp.send_queue:* ready to send.
*mptcp.unack_queue:* sent but not yet acked.
*data.subflow:* subflow where data was sent.

```
1: while mptcp.send_queue != NULL do.
2:     data = dequeue(mptcp.send_queue);
3:     subflow = mptcp.sched.get_subflow();
4:     send_data(subflow, data);
5:     data.subflow = subflow;
6:     enqueue(mptcp.unack_queue, data);
7: end while
8:
9: /* Now send_queue is empty; retransmit all
      unacked packets via different paths. */
10: while mptcp.unack_queue != NULL do
11:     data = dequeue(mptcp.unack_queue);
12:     new_subflow = mptcp.sched.get_subflow();
13:     if data.subflow != new_subflow then
14:         send_data(new_subflow, data);
15:     end if
16: end while
```

US 10,020,918 B2

FAST COUPLED RETRANSMISSION FOR MULTIPATH COMMUNICATIONS

TECHNICAL FIELD

The disclosure relates generally to the field of communications and, more particularly but not exclusively, to supporting multipath communications.

BACKGROUND

Transmission Control Protocol (TCP) is a transport layer protocol enabling a pair of peers to establish a connection and to exchange data via the connection. TCP uses a single path between the peers. Multipath TCP (MPTCP) provides the ability to simultaneously use multiple paths between peers. In MPTCP, data may be exchanged between the peers using multiple TCP flows via multiple, potentially disjoint, paths.

SUMMARY

The present disclosure generally discloses mechanisms for supporting multipath communications.

In at least some embodiments, an apparatus includes a processor and a memory communicatively connected to the processor, where the processor is configured to support communication via a multipath transport connection. The processor is configured to detect, at a multipath sender for a multipath transport connection using a set of transport sub-flows to transport a plurality of data packets toward a multipath receiver, a first condition in which the multipath sender has transmitted each of the data packets toward the multipath receiver via the multipath transport connection and a second condition in which, for one of the data packets transmitted by the multipath sender toward the multipath receiver via a first one of the transport sub-flows, the multipath sender has not received an acknowledgment by the multipath receiver that the one of the data packets was received by the multipath receiver. The processor is configured to initiate retransmission of the one of the data packets, from the multipath sender toward the multipath receiver via a second one of the transport sub-flows, based on detection of the first condition and the second condition.

In at least some embodiments, a non-transitory computer-readable storage medium stores instruction which, when executed by a processor, cause the process to perform a method to support communication via a multipath transport connection. The method includes detecting, at a multipath sender for a multipath transport connection using a set of transport sub-flows to transport a plurality of data packets toward a multipath receiver, a first condition in which the multipath sender has transmitted each of the data packets toward the multipath receiver via the multipath transport connection and a second condition in which, for one of the data packets transmitted by the multipath sender toward the multipath receiver via a first one of the transport sub-flows, the multipath sender has not received an acknowledgment by the multipath receiver that the one of the data packets was received by the multipath receiver. The method includes initiating retransmission of the one of the data packets, from the multipath sender toward the multipath receiver via a second one of the transport sub-flows, based on detection of the first condition and the second condition.

In at least some embodiments, a method supports communication via a multipath transport connection. The method includes detecting, at a multipath sender for a multipath transport connection using a set of transport sub-flows to transport a plurality of data packets toward a multipath receiver, a first condition in which the multipath sender has transmitted each of the data packets toward the multipath receiver via the multipath transport connection and a second condition in which, for one of the data packets transmitted by the multipath sender toward the multipath receiver via a first one of the transport sub-flows, the multipath sender has not received an acknowledgment by the multipath receiver that the one of the data packets was received by the multipath receiver. The method includes initiating retransmission of the one of the data packets, from the multipath sender toward the multipath receiver via a second one of the transport sub-flows, based on detection of the first condition and the second condition.

BRIEF DESCRIPTION OF THE DRAWINGS

The teachings herein can be readily understood by considering the following detailed description in conjunction with the accompanying drawings, in which:

FIG. 6 depicts pseudocode of a method for providing the multipath retransmission capability.

To facilitate understanding, identical reference numerals have been used, where possible, to designate identical elements that are common to the figures.

DETAILED DESCRIPTION

The present disclosure generally discloses various mechanisms for supporting multipath communications, including mechanisms for supporting retransmissions for multipath communications. The Transmission Control Protocol (TCP) is a transport layer protocol that enables a pair of peers to establish a transport layer connection and to exchange data via the transport layer connection (typically referred to as a TCP connection). TCP uses a single path between the peers and, thus, also may be referred to herein as single-path TCP (SPTCP). Multipath TCP (MPTCP), which supports multipath communications, provides the ability to simultaneously use multiple paths between peers to exchange data between the peers. In MPTCP, data is exchanged between the peers using an MPTCP connection composed of multiple TCP sub-flows that are transported via multiple, potentially disjoint, paths between the peers. In MPTCP, packet retransmissions may be required in order for all of the data to be successfully exchanged between the peers of the MPTCP connection. Various embodiments presented herein support improved packet retransmissions within the context of an MPTCP connection. For example, various embodiments presented herein support retransmission of lost or delayed packets of an MPTCP connection in a manner tending to avoid a timeout of the MPTCP connection. For example, various embodiments presented herein support retransmission of lost or delayed packets of an MPTCP connection by monitoring for detection of a packet retransmission condition and, based on a determination that the packet retransmission condition is detected, initiating retransmission of one or more data packets of the MPTCP connection. Various embodiments support effective retransmission of lost or delayed packets of a multipath transport connection, avoiding timeouts, such that flow completion time is reduced (and, potentially, significantly reduced for relatively short flows in which the flow duration is relatively small compared to timeout duration). It is noted that, although primarily presented herein with respect to embodiments in which improved packet retransmissions are supported within the context of a particular type of multipath communication (namely, MPTCP), various embodiments presented herein may be adapted to support improved packet retransmissions within the context of various other types of multipath communications (e.g., multipath communications based on other protocols). Various embodiments discussed above may be further understood by way of reference to FIG. 1.

Figure 1:
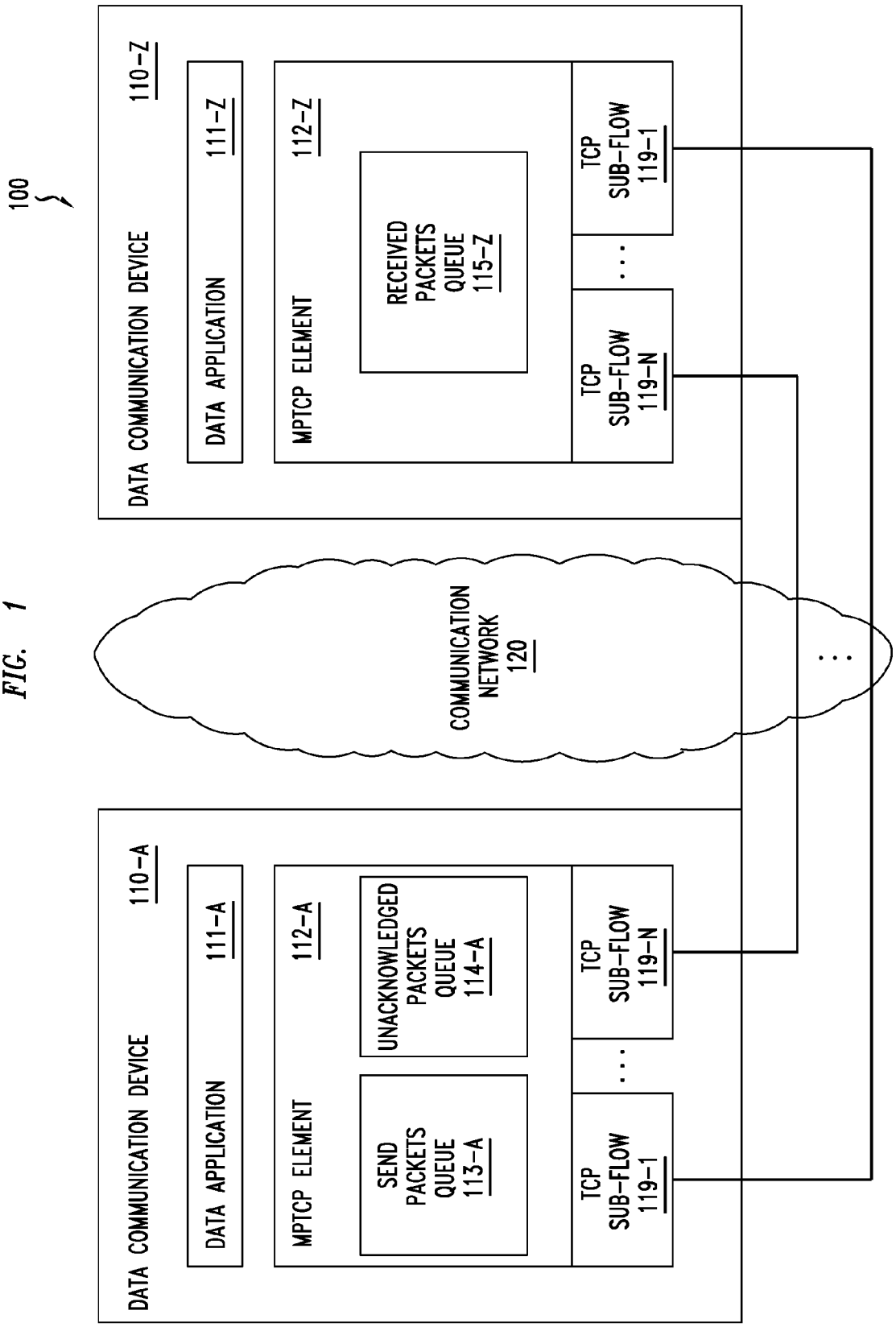
FIG. 1 depicts a high-level block diagram of a system supporting various embodiments of a multipath retransmission capability.

FIG. 1 depicts a high-level block diagram of a system supporting various embodiments of the multipath retransmission capability.

The system 100 includes a pair of data communication devices (DCDs) 110-A and 110-Z (collectively, DCDs 110) and a communication network (CN) 120.

The DCDs 110 are configured to operate as endpoints of a multipath transport connection provided using a multipath transport protocol. In the exemplary embodiment of FIG. 1, the DCDs 110 are configured to operate as the endpoints of a multipath transport connection. The DCDs 110 support a data application (DA) 111 where, illustratively, an instance of the DA 111 (DA 111-A) is running on DCD 110-A and an instance of the DA 111 (DA 111-Z) is running on DCD 110-Z. The DCDs 110 exchange data packets between the DA 111-A running on DCD 110-A and the DA 111-Z running on DCD 110-Z using the multipath transport connection. The data packets may transport various types of data which may be exchanged between the DCDs 110 (e.g., text, audio, video, multimedia, or the like, as well as combinations thereof).

The DCDs 110 may include any suitable devices which may operate as endpoints of a multipath transport connection, such as end user devices (e.g., a desktop computer, a laptop computer, a tablet computer, a smartphone, a set-top box, a smart television, or the like), machine-to-machine (M2M) communication devices, datacenter communication devices (e.g., physical switches, virtual switches, virtual machines (VMs), or the like), network devices (e.g., such as where multipath transport is supported within the network portion of an end-to-end path), or the like, as well as various combinations thereof.

The DCDs 110 are configured to exchange data packets between the DA 111-A running on DCD 110-A and the DA 111-Z running on DCD 110-Z using a multipath TCP (MPTCP) connection. The DCDs 110 include MPTCP elements 112 configured to support transmission of data between the DAs 111 using MPTCP (illustratively, DCD 110-A includes an MPTCP element 112-A supporting communications of DA 111-A and DCD 110-Z includes an MPTCP element 112-Z supporting communications of DA 111-Z). The MPTCP elements 112 are configured to support the MPTCP connection, with the MPTCP connection being established between the MPTCP elements 112. The MPTCP connection supported by MPTCP elements 112 is composed of a set of multiple TCP sub-flows 119-1-119-N (collectively, TCP sub-flows 119). The MPTCP elements 112 are configured to support communication via the MPTCP connection, for transporting data between the DA 111-A running on DCD 110-A and the DA 111-Z running on DCD 110-Z, using the TCP sub-flows 119. The MPTCP element 112-A of the DCD 110-A is configured to map packets of the data flow of DA 111-A into the TCP sub-flows 119 for transport to DCD 110-Z and, similarly, the MPTCP element 112-Z of the DCD 110-Z is configured to recombine the packets received from DCD 110-A via the TCP sub-flows 119 into a data flow for DA 111-Z of DCD 110-Z. The TCP sub-flows 119 of the MPTCP connection may traverse multiple communication paths within the CN 120, as discussed further below.

The CN 120 is a multipath communication network supporting a set of multiple communication paths (omitted from FIG. 1 for purposes of clarity). It is noted that the multiple communication paths may include less than N communication paths (e.g., in which case at least one of the communication paths may support more than one of the TCP sub-flows 119 of the MPTCP connection) or more than N communication paths (e.g., in which case each of the TCP sub-flows 119 may utilize its own communication path of the CN 120 or TCP sub-flows 119 may share communication paths of the CN 120).

The CN 120 may support communications at various communications layers. The CN 120 may support communications at the physical layer (which also may be referred to as layer 1), the data link layer (which also may be referred to as layer 2), and the network layer (which also may be referred to as layer 3). For example, within the context of the Open Systems Interconnection (OSI) model, CN 120 may support communications at OSI Layer 1 (L1), OSI Layer 2 (L2), OSI Layer 2.5 (L2.5), and OSI Layer 3 (L3). The CN 120 may support communications at various other communications layers.

The CN 120 may support communications using various technologies configured for communication at various communication layers. For example, CN 120 may support communications using various combinations of optical networks and networking technologies (e.g., Optical Transport Networks (OTNs), Wavelength Division Multiplexing (WDM), Dense WDM (DWDM), or the like), Ethernet, Multiprotocol Label Switching (MPLS), Internet Protocol (IP), or the like, as well as various combinations thereof. The CN 120 may support communications using various other technologies configured for communication at various communication layers.

The CN 120 may support communications using various elements (e.g., nodes, communication links, or the like) configured to support communications at various communication layers. The nodes may include access/edge nodes, core nodes, control nodes, or the like, as well as various combinations thereof. For example, CN 120 may include routers (e.g., layer 3 routers, layer 3/2 routers, or the like), switches (e.g., layer 3 switches, layer 2 switches, or the like), hubs, repeaters, signaling nodes, or the like, as well as various combinations thereof. The CN 120 may support communications using various other elements configured to support communication at various communication layers.

The CN 120 may include various types of communication networks which may support communications by various different types of DCDs 110. For example, within the context of an operator network (e.g., where the DCDs 110 may include end user devices, an end user device and a network device, or network devices), the CN 120 may include one or more communication networks supporting multipath communication between the DCDs 110. For example, where DCD 110-A and DCD 110-Z are end user devices and DCD 110-A is a dual-mode smartphone, CN 120 may include a cellular wireless network and a WiFi access network available to DCD 110-A and providing two at least partially disjoint paths from DCD 110-A to DCD 110-Z. For example, where DCD 110-A is a customer premises router and DCD 110-Z is a network server, CN 120 may include multiple network access points enabling multi-homing of DCD 110-A such that there are two at least partially disjoint paths from DCD 110-A to DCD 110-Z. For example, where DCD 110-A is wireless access node (e.g., a Long Term Evolution (LTE) Evolved Node B (eNodeB)) and DCD 110-Z is a network element of a core wireless network (e.g., a Mobility Management Entity of an LTE Evolved Packet Core (EPC) network), CN 120 may include portions of the wireless access network and portions of the wireless core network as well as a backhaul network therebetween where the backhaul network supports two at least partially disjoint paths from DCD 110-A to DCD 110-Z. For example, within the context of a datacenter where the DCD 110-A and DCD 110-Z are virtual machines (VMs), the CN 120 may include a datacenter network supporting multipath communication between the VMs (e.g., using top-of-rack (ToR) switches, end-of-rack (EoR) switches, aggregating switches, routers, advanced datacenter networking topologies (e.g., FatTree, VL2, BCube, or like topologies), or the like, as well as various combinations thereof). It is noted that MPTCP may be used within various other contexts and, thus, that CN 120 may be implemented in various ways for supporting multipath communications between various combinations of device types. It is noted that various other types of multipath communication networks and associated multipath communication network technologies may be used to support the communication paths of the CN 120 and, thus, to support the TCP sub-flows 119 of the MPTCP connection. The CN 120 may be configured in various other ways.

The MPTCP elements 112 are configured to support transmission of data packets via the MPTCP connection. The MPTCP elements 112 are configured to support MPTCP congestion control functions and MPTCP scheduling functions. The MPTCP congestion control functions supported by the MPTCP elements 112 may include any suitable congestion control mechanisms which may be used with the MPTCP connection (e.g., use of dynamic congestion control window sizes, use of the Linked-Increases Algorithm (LIA), use of the Opportunistic Linked-Increases Algorithm (OLIA), use of the Balanced Link Adaptation Algorithm (BALIA), or the like). The MPTCP scheduling functions supported by the MPTCP elements 112 may include scheduling functions typically supported for MPTCP connections (e.g., assigning data packets of the MPTCP connection to TCP sub-flows 119), retransmission of data packets of the MPTCP connection using embodiments of the packet retransmission capability, or the like. The MPTCP elements 112 may be configured to support various other functions supporting transport of data packets via the MPTCP connection.

The MPTCP elements 112 may be configured to support transmission of data packets via the MPTCP connection.

The MPTCP element 112-A of the DCD 110-A is configured to support transport of data packets of the DA 111 from DCD 110-A to DCD 110-Z via the MPTCP connection. The MPTCP element 112-A controls transmission of the data packets of the MPTCP connection via the TCP sub-flows 119 of the MPTCP connection. The MPTCP element 112-A of the DCD 110-A maintains a send packets queue 113-A and an unacknowledged packets queue 114-A. The MPTCP element 112-A receives data packets from the DA 111-A and stores the data packets in the send packets queue 113-A while the data packets are awaiting transmission by the MPTCP element 112-A via the MPTCP connection. The MPTCP element 112-A, when sending a data packet via the MPTCP connection, selects one of the TCP sub-flows 119 via which the data packet is to be transmitted, removes the data packet from the send packets queue 113-A, transmits the data packet via the selected one of the TCP sub-flows 119, and adds the data packet to the unacknowledged packets queue 114-A. The unacknowledged packets queue 114-A represents data packets of the MPTCP connection which have been transmitted from DCD 110-A toward DCD 110-Z, but for which the DCD 110-A has not yet received an acknowledgement from the DCD 110-Z indicating that the data packet was successfully received by the DCD 110-Z. The MPTCP element 112-A, upon receiving from the MPTCP element 112-Z an acknowledgement indicating that a data packet transmitted by the MPTCP element 112-A via one of the TCP sub-flows 119 was successfully received by the MPTCP element 112-Z, removes that data packet from the unacknowledged packets queue 114-A.

The MPTCP element 112-Z of the DCD 110-Z is configured to support transport of data packets of the DA 111 from DCD 110-A to DCD 110-Z via the MPTCP connection. The MPTCP element 112-Z controls reception of the data packets of the MPTCP connection via the TCP sub-flows 119 of the MPTCP connection. The MPTCP element 112-Z of the DCD 110-Z maintains a received packets queue 115-Z. The MPTCP element 112-Z receives data packets of the MPTCP connection via the TCP sub-flows 119 of the MPTCP connection. The MPTCP element 112-Z stores the received data packets in the received packets queue 115-Z. The MPTCP element 112-Z stores the received data packets in the received packets queue 115-Z such that the data packets are in-order with respect to the MPTCP connection. The MPTCP element 112-Z provides in-order data packets of the received packets queue 115-Z to the DA 111-Z. The MPTCP element 112-Z continues to maintain out-of-order data packets in the received packets queue 115-Z until the out-of-order data packets become in-order data packets. For example, where four data packets are transmitted from MPTCP element 112-A to MPTCP element 112-Z via the MPTCP connection, but the third data packet is not successful received by the MPTCP element 112-Z, the MPTCP element 112-Z may provide the first and second packets from the received packets queue 115-Z to the DA 111-Z and may hold the fourth packets in the received packets queue 115-Z pending receipt of the third packet (at which time MPTCP element 112-Z may provide the third and fourth packets from the received packets queue 115-Z to the DA 111-Z in-order). The MPTCP element 112-Z, upon successfully receiving a data packet from the MPTCP element 112-A, sends an acknowledgment for the data packet to the MPTCP element 112-A in order to acknowledge that the data packet was successfully received by MPTCP element 112-Z.

The MPTCP element 112-A is configured to support retransmission of data packets via the MPTCP connection. The MPTCP element 112-A may be configured to support retransmission of data packets via the MPTCP connection using the packet retransmission capability. In at least some embodiments, the packet retransmission capability may be invoked when the following two conditions are satisfied: (1) the last data packet of the MPTCP connection is successfully transmitted from the source of the MPTCP connection to the destination of the MPTCP connection via one of the TCP sub-flows of the MPTCP connection (illustratively, from MPTCP element 112-A to MPTCP element 112-Z via one of the TCP sub-flows 119) and (2) at least one out-of-order data packet is received by the destination of the MPTCP connection (e.g., illustratively, by MPTCP element 112-Z). The first condition suggests that there is at least one available TCP sub-flow of the MPTCP connection that does not experience congestion and, thus, which can be reliably used for data packet retransmission. The second condition suggests that at least one of the paths utilized by at least one of the TCP sub-flows of MPTCP connection may be congested (e.g., packet loss, queueing delay, or the like) and, thus, that the MPTCP connection may be at risk of experiencing a timeout). It is noted that, while out-of-order data packets do not always result from packet losses in multipath transfers, an indication of congestion can still be inferred from out-of-order packets (e.g., where a packet is out of order not due to its traversing a longer path relative to other paths, but, rather, due to at least some level of congestion on the path that it traversed). It is noted that the first condition and the second condition can be satisfied at the same time since MPTCP uses two types of sequence numbers for each data packet transmitted via the MPTCP connection (namely, a data sequence number (denoted herein as data_seq) which indicates the overall position of the data packet in the MPTCP connection and a sub-flow sequence number (denoted herein as subflow_seq) which indicates the position of the data packet in the respective TCP sub-flow to which the data packet is assigned). As a result, a data packet of the MPTCP connection can be in-order with respect to the sub-flow sequence number (thus meeting the first condition) and can also be out-of-order with respect to the data sequence number (thus meeting the second condition).

The MPTCP element 112-A is configured to provide data packet retransmission for the MPTCP connection.

The MPTCP element 112-A may be configured to provide data packet retransmission for the MPTCP connection in a manner tending to prevent a timeout of the MPTCP connection.

The MPTCP element 112-A may be configured to provide data packet retransmission for the MPTCP connection by monitoring for a packet retransmission condition and, based on a determination that the packet retransmission condition is detected, initiating retransmission of one or more data packets of the MPTCP connection.

The MPTCP element 112-A, as noted above, may be configured to monitor for a packet retransmission condition. The MPTCP element 112-A may be configured to monitor for a packet retransmission condition by monitoring the send packets queue 113-A of the MPTCP element 112-A and monitoring the unacknowledged packets queue 114-A of the MPTCP element 112-A. The packet retransmission condition may be a condition in which the send packets queue 113-A of the MPTCP element 112-A is empty and the unacknowledged packets queue 114-A of the MPTCP element 112-A is not empty. The MPTCP element 112-A may monitor for the packet retransmission condition by monitoring the send packets queue 113-A of the MPTCP element 112-A and in order to identify a first condition in which the send packets queue 113-A is empty (which corresponds to the first condition discussed above) and monitoring the unacknowledged packets queue 114-A of the MPTCP element 112-A in order to identify a second condition in which one or more data packets remain in the unacknowledged packets queue 114-A (which corresponds to the second condition). The MPTCP element 112-A may monitor the send packets queue 113-A and the unacknowledged packets queue 114-A during the MPTCP connection, may monitor the send packets queue 113-A until detecting that the send packets queue 113-A is empty and then begin monitoring the unacknowledged packets queue 114-A based on detection of the send packets queue 113-A as being empty, or the like.

The MPTCP element 112-A, as noted above, may be configured to initiate retransmission of one or more data packets of the MPTCP connection based on detection of the packet retransmission condition. The one or more data packets of the MPTCP connection to be retransmitted are the one or more data packets remaining in the unacknowledged packets queue 114-A after the detection of the send packets queue 113-A as being empty. The MPTCP element 112-A may be configured to initiate retransmission of one or more data packets of the MPTCP connection by removing the one or more data packets from the unacknowledged packets queue 114-A and transmitting the one or more data packets via the MPTCP connection. The MPTCP element 112-A may be configured to retransmit data packets of the unacknowledged packets queue 114-A in a manner tending to prevent data packet retransmissions on any congested TCP sub-flows 119. The MPTCP element 112-A may be configured to retransmit data packets of the unacknowledged packets queue 114-A using, for each of the data packets of the unacknowledged packets queue 114-A, a different TCP sub-flow 119 than the TCP sub-flow 119 that was used to initially transmit the data packet.

The MPTCP element 112-A may be configured to retransmit data packets of the unacknowledged packets queue 114-A immediately without waiting for receipt of acknowledgments for the data packets of the unacknowledged packets queue 114-A (e.g., after detecting that the send packets queue 113-A is empty and that the unacknowledged packets queue 114-A is not empty) or may be configured to retransmit data packets of the unacknowledged packets queue 114-A after expiration of a time period. The time period may be configurable and may be set to different values depending on various factors (e.g., the length or expected length of the MPTCP connection in time, the length of the timeout period set for the MPTCP connection, or the like). The time period may be set to a value that is less than the length of the timeout period for the MPTCP connection, thereby giving at least some time for receipt of acknowledgment messages that may be in transit without significantly delaying completion of the MPTCP connection and without significantly increasing the risk of a timeout of the MPTCP connection. For example, where the MPTCP connection is a 10 ms flow and the timeout period of the MPTCP connection is 200 ms, delaying the retransmission of unacknowledged data packets of the unacknowledged packets queue 114-A for a length of time less than 200 ms (e.g., 1 ms, 2 ms, or the like) provides additional time for receipt of acknowledgment messages that may be in transit without significantly delaying completion of the MPTCP connection (since the length of the delay period is significantly less than the length of the MPTCP connection) and without significantly increasing the risk of a timeout of the MPTCP connection (since the sum of the length of the MPTCP connection and the length of the delay period is significantly less than the 200 ms timeout period of the MPTCP connection).

It is noted that the proactive retransmission of the data packet(s) of the unacknowledged packets queue 114-A, rather than waiting for the length of the timeout period of the MPTCP connection for receipt of the acknowledgement(s) for the data packet(s) of the unacknowledged packets queue 114-A (which would ultimately result in a timeout of the MPTCP connection), prevents a timeout of the MPTCP connection.

It is noted that the MPTCP element 112-A may be configured to support various other functions in order to provide the packet retransmission capability.

Figure 2:
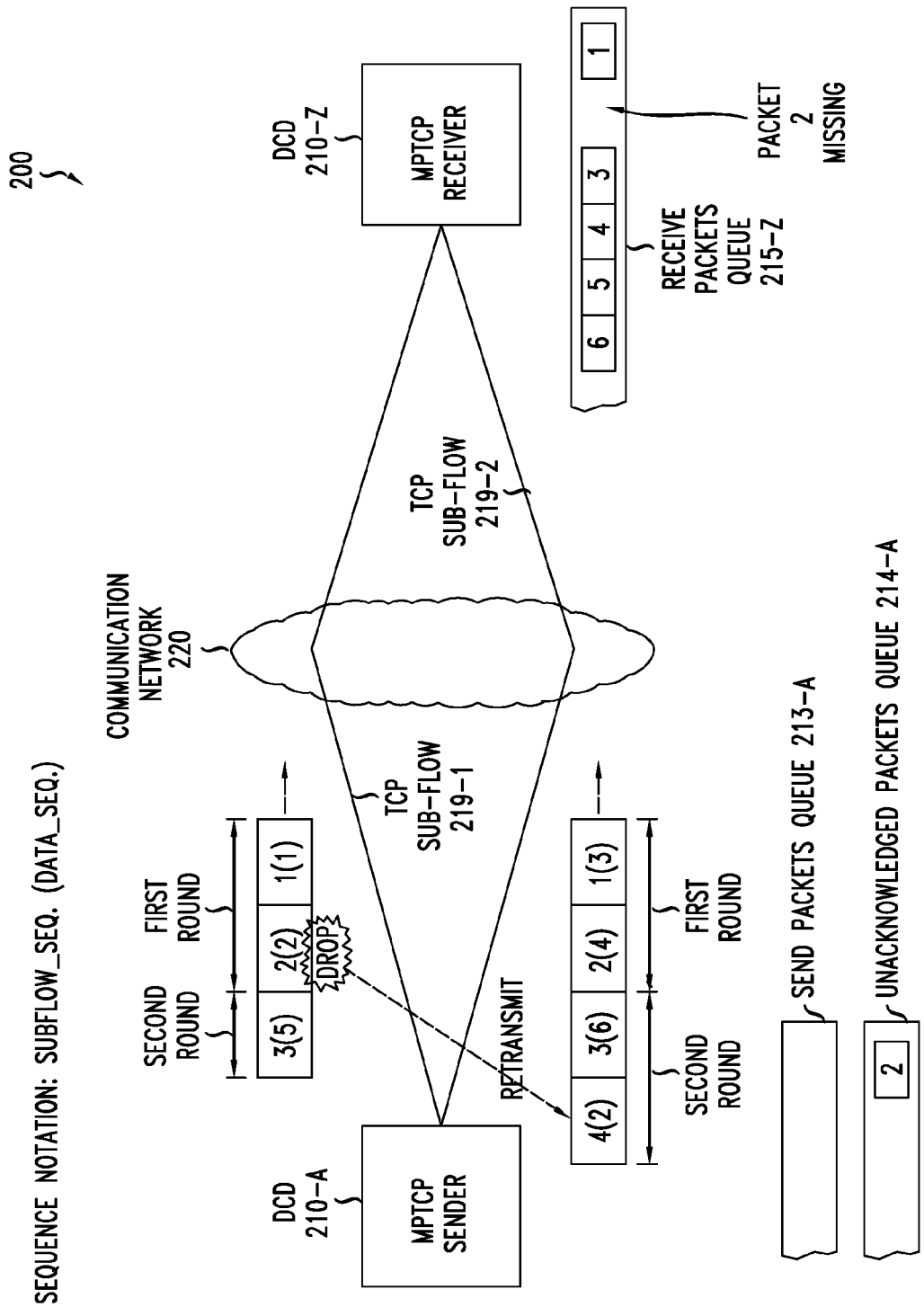
FIG. 2 depicts a high-level block diagram of a system illustrating an example of the multipath retransmission capability.

It is noted that the operation of MPTCP element 112-A in supporting the packet retransmission capability may be further understood by way of reference to the example of FIG. 2.

It will be appreciated that, although primarily presented herein with respect to embodiments in which the packet retransmission capability is provided for a single direction of transmission (namely, from DCD 110-A to DCD 110-Z), embodiments in which the packet retransmission capability is provided for both directions of transmission also may be supported (namely, from DCD 110-A to DCD 110-Z and from DCD 110-Z to DCD 110-A, in which case DCD 110-Z may include a send packets queue and an unacknowledged packets queue and DCD 110-A may include a received packets queue).

FIG. 2 depicts a high-level block diagram of a system illustrating an example of the multipath retransmission capability.

The system 200 includes a pair of data communication devices (DCDs) 210-A and 210-Z (collectively, DCDs 210) and a communication network (CN) 220, which may be similar to DCDs 110-A and 110-Z and CN 120 of FIG. 1, respectively. The DCD 210-A and the DCD 210-Z operate as an MPTCP sender and an MPTCP receiver, respectively, of an MPTCP connection that is established between DCD 210-A and DCD 210-Z via CN 220. The DCD 210-A includes a send packets queue 213-A and an unacknowledged packets queue 214-A, which are similar to the send packets queue 113-A and the unacknowledged packets queue 114-A of DCD 110-A of FIG. 1, respectively. The DCD 210-Z includes a received packets queue 215-Z, which is similar to the received packets queue 115-Z of DCD 110-Z of FIG. 1, respectively. The MPTCP connection is composed of two TCP sub-flows 219-1 and 219-2 (collectively, TCP sub-flows 219) between the DCD 210-A and DCD 210-Z via two different communication paths of the CN 220.

In the example of FIG. 2, the DCD 210-A has six data packets to be sent to the DCD 210-Z via the MPTCP connection. The TCP sub-flows 219 each have a congestion window size of two (such that each transmission round of each of the TCP sub-flows 219 supports transmission of two data packets). The DCDs 210 use two types of sequence numbers to track the data packets transmitted via the MPTCP connection: (1) a data sequence number for the MPTCP connection (denoted herein as data_seq) which indicates the overall position of the data packet within the MPTCP connection and (2) for each of the TCP sub-flows 219, a sub-flow sequence number (denoted herein as sub-flow_seq) which indicates the position of the data packet in the respective TCP sub-flow 219 to which the data packet is assigned for transmission). In the example of FIG. 2, the following sequence notation is used: subflow_seq (data_seq).

In the example of FIG. 2, the DCD 210-A sends the six data packets to the DCD 210-Z via the MPTCP connection as follows. The first packet of the MPTCP connection, which is sent by DCD 210-A via TCP sub-flow 219-1 in a first transmission round of the TCP sub-flow 219-1, is the first data packet that is transmitted via the TCP sub-flow 219-1 and, thus, has a sequence notation of 1(1). The second packet of the MPTCP connection, which is sent by DCD 210-A via TCP sub-flow 219-1 in the first transmission round of the TCP sub-flow 219-1, is the second data packet that is transmitted via the TCP sub-flow 219-1 and, thus, has a sequence notation of 2(2). The third packet of the MPTCP connection, which is sent by DCD 210-A via TCP sub-flow 219-2 in the first transmission round of the TCP sub-flow 219-2, is the first data packet that is transmitted via the TCP sub-flow 219-2 and, thus, has a sequence notation of 1(3). The fourth packet of the MPTCP connection, which is sent by DCD 210-A via TCP sub-flow 219-2 in the first transmission round of the TCP sub-flow 219-2, is the second data packet that is transmitted via the TCP sub-flow 219-2 and, thus, has a sequence notation of 2(4). The fifth packet of the MPTCP connection, which is sent by DCD 210-A via TCP sub-flow 219-1 in a second transmission round of the TCP sub-flow 219-1, is the third data packet that is transmitted via the TCP sub-flow 219-1 and, thus, has a sequence notation of 3(5). The sixth packet of the MPTCP connection, which is sent by DCD 210-A via TCP sub-flow 219-2 in a second transmission round of the TCP sub-flow 219-2, is the third data packet that is transmitted via the TCP sub-flow 219-2 and, thus, has a sequence notation of 3(6).

In the example of FIG. 2, the second packet sent by DCD 210-A via the MPTCP connection is dropped along the communication path of TCP sub-flow 219-1 and, thus, is not received by the DCD 210-Z. This is reflected in the received packets queue 215-Z of DCD 210-Z, which illustrates that the first, third, fourth, fifth, and sixth packets of the MPTCP connection have been received by DCD 210-Z, but that the second packet of the MPTCP connection has not been received by DCD 210-Z. It will be appreciated that, following transmission of the sixth (and final) packet of the MPTCP connection, and due to dropping of the second packet of the MPTCP connection such that receipt of the second packet of the MPTCP connection by DCD 210-Z has not been acknowledged, the send packets queue 213-A of DCD 210-A is empty and the unacknowledged packets queue 214-A of the DCD 210-A is non-empty (namely, it includes the second packet of the MPTCP connection that was dropped). The DCD 210-A will detect this condition and initiate retransmission of the second packet of the MPTCP connection. The DCD 210-A, since the second packet of the MPTCP connection was initially transmitted via the TCP sub-flow 219-1, will initiate retransmission of the second packet of the MPTCP connection via the TCP sub-flow 219-2. As depicted in FIG. 2, DCD 210-A retransmits the second packet of the MPTCP connection via the TCP sub-flow 219-1 in the second portion of the second transmission round of the TCP sub-flow 219-1.

Figure 3:
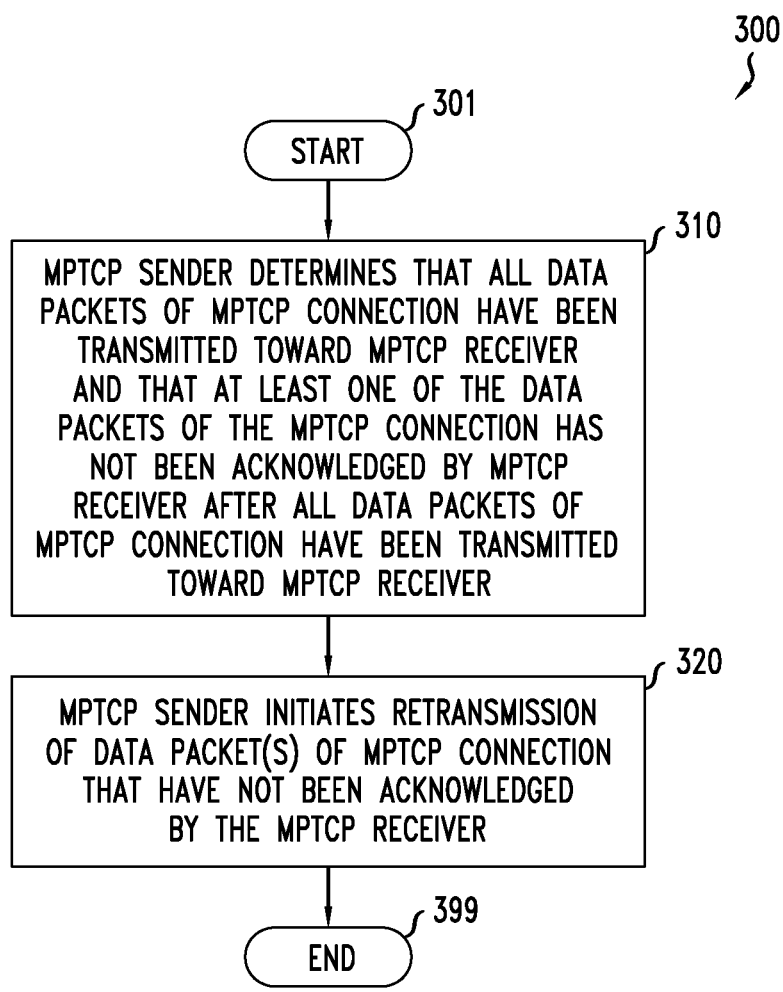
FIG. 3 depicts a flow diagram of a method for providing the multipath retransmission capability.

FIG. 3 depicts a flow diagram of a method for providing the multipath retransmission capability. The method 300 of FIG. 3 may be performed by an MPTCP sender. It will be appreciated that, although primarily depicted and described as being performed serially, at least a portion of the steps of method 300 may be performed contemporaneously or in a different order than as presented in FIG. 3. At step 301, method 300 begins. At step 310, the MPTCP sender determines that all of the data packets of MPTCP connection have been transmitted by the MPTCP sender toward the MPTCP receiver and that at least one of the data packets of the MPTCP connection has not been acknowledged by the MPTCP receiver after all of the data packets of MPTCP connection have been transmitted by the MPTCP sender toward the MPTCP receiver. The MPTCP sender may determine that all of the data packets of MPTCP connection have been transmitted by the MPTCP sender toward the MPTCP receiver based on a send packets queue of the MPTCP sender (e.g., based on a determination that the send packets queue of the MPTCP sender is empty). The MPTCP sender may determine that at least one of the data packets of the MPTCP connection has not been acknowledged by the MPTCP receiver after all of the data packets of MPTCP connection have been transmitted by the MPTCP sender toward the MPTCP receiver based on an unacknowledged packets queue of the MPTCP sender (e.g., based on a determination that the unacknowledged packets queue of the MPTCP sender is non-empty when the send packets queue of the MPTCP sender is empty). At step 320, the MPTCP sender initiates retransmission of the data packets of the MPTCP connection that have not been acknowledged by the MPTCP receiver. The MPTCP sender, for a given data packet to be retransmitted via the MPTCP connection, may initiate retransmission of the data packet using a TCP sub-flow of the MPTCP connection that is different than the TCP sub-flow of the MPTCP connection via which the data packet was originally transmitted by the MPTCP sender. At step 399, method 300 ends. It is noted that method 300 of FIG. 3 may be further understood by way of reference to FIG. 1 and FIG. 2.

Figure 4:
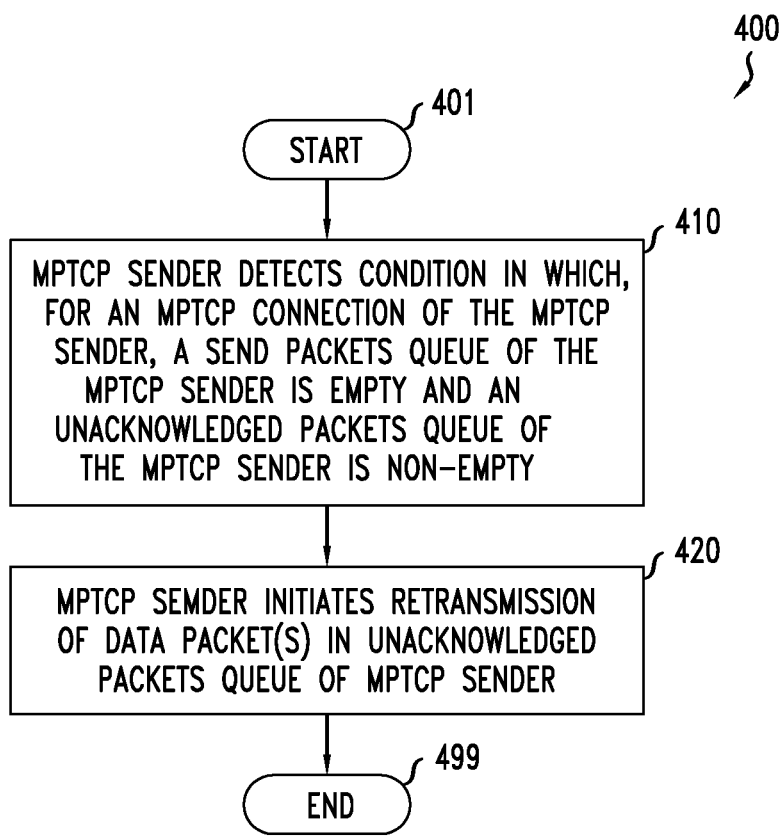
FIG. 4 depicts a flow diagram of a method for providing the multipath retransmission capability.

FIG. 4 depicts a flow diagram of a method for providing the multipath retransmission capability. The method 400 of FIG. 4 may be performed by an MPTCP sender. It will be appreciated that, although primarily depicted and described as being performed serially, at least a portion of the steps of method 400 may be performed contemporaneously or in a different order than as presented in FIG. 4. At step 401, method 400 begins. At step 410, the MPTCP sender detects a condition in which, for an MPTCP connection of the MPTCP sender, a send packets queue of the MPTCP sender is empty and an unacknowledged packets queue of the MPTCP sender is non-empty. At step 420, the MPTCP sender initiates retransmission of the data packet(s) in the unacknowledged packets queue of the MPTCP sender. The MPTCP sender, for a given data packet of the unacknowledged packets queue, may initiate retransmission of the data packet using a TCP sub-flow of the MPTCP connection that is different than a TCP sub-flow of the MPTCP connection via which the data packet was originally transmitted by the MPTCP sender. At step 499, method 400 ends. It is noted that, in at least some embodiments, steps 410 and 420 of FIG. 4 may be used to provide steps 310 and 320 of FIG. 3, respectively. It is noted that method 400 of FIG. 4 may be further understood by way of reference to FIG. 1 and FIG. 2.

Figure 5:
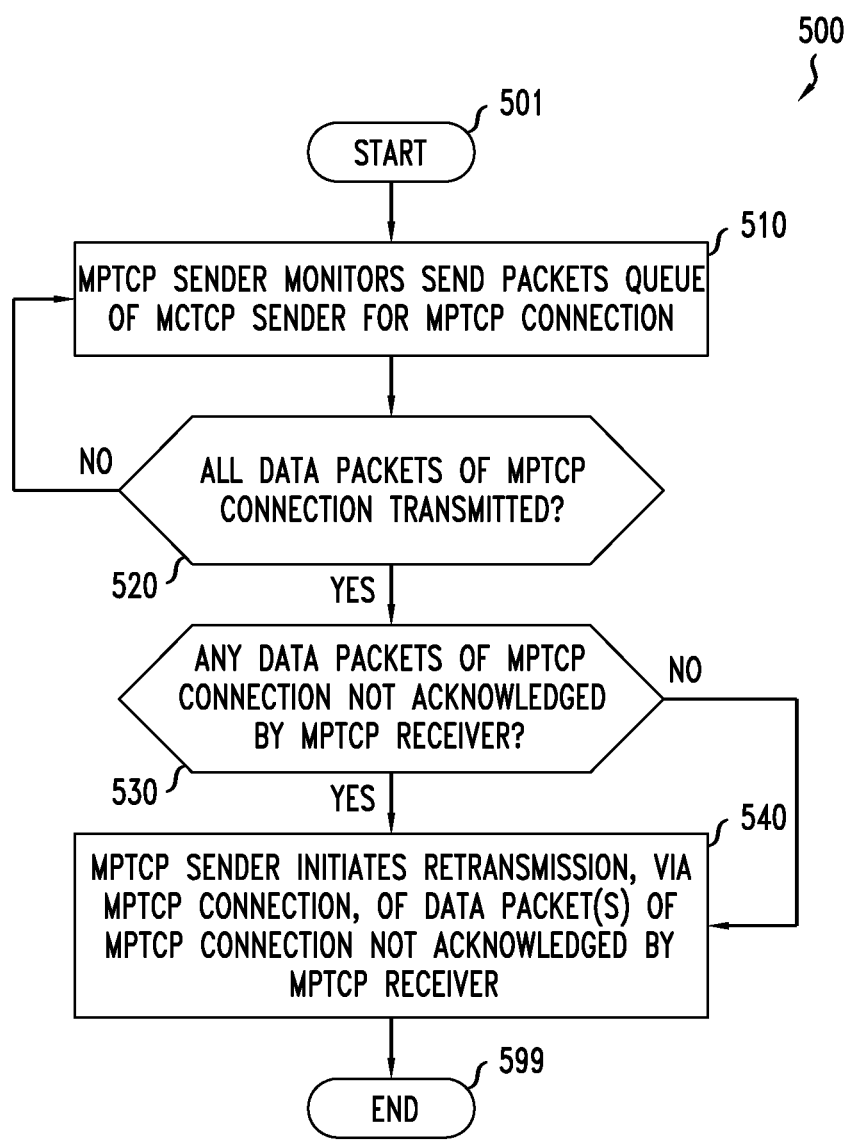
FIG. 5 depicts a flow diagram of a method for providing the multipath retransmission capability.

FIG. 5 depicts a flow diagram of a method for providing the multipath retransmission capability. The method 500 of FIG. 5 may be performed by an MPTCP sender. It will be appreciated that, although primarily depicted and described as being performed serially, at least a portion of the steps of method 500 may be performed contemporaneously or in a different order than as presented in FIG. 5. At step 501, method 500 begins. At step 510, the MPTCP sender monitors a send packets queue of the MPTCP sender for the MPTCP connection. At step 520, the MPTCP sender determines, based on monitoring of the send packets queue of the MPTCP sender for the MPTCP connection, whether all of the data packets of the MPTCP connection have been transmitted by the MPTCP sender toward the MPTCP receiver. For example, the MPTCP sender may determine that all of the data packets of the MPTCP connection have been transmitted by the MPTCP sender toward the MPTCP receiver based on detection that the send packets queue of the MPTCP sender for the MPTCP connection is empty. If the MPTCP sender determines that all of the data packets of the MPTCP connection have not been transmitted by the MPTCP sender toward the MPTCP receiver, the method 500 returns to step 510 (i.e., the MPTCP sender loops within steps 510 and 520 until the MPTCP sender detects that all of the data packets of the MPTCP connection have been transmitted by the MPTCP sender toward the MPTCP receiver). If the MPTCP sender determines that all of the data packets of the MPTCP connection have been transmitted by the MPTCP sender toward the MPTCP receiver, the method 500 proceeds to step 530. At step 530, the MPTCP sender determines whether there are any data packets of the MPTCP connection that have not been acknowledged by the MPTCP receiver. For example, the MPTCP sender may determine whether there are any data packets of the MPTCP connection that have not been acknowledged by the MPTCP receiver by determining whether the unacknowledged packets queue of the MPTCP sender for the MPTCP connection is non-empty (e.g., the MPTCP sender determines that there are one or more data packets of the MPTCP connection that have not been acknowledged by the MPTCP receiver based on a determination that the unacknowledged packets queue of the MPTCP sender for the MPTCP connection is non-empty). If the MPTCP sender determines that there are no data packets of the MPTCP connection that have not been acknowledged by the MPTCP receiver (such that no retransmission of data packets is necessary), method 500 proceeds to step 599, where method 500 ends. If the MPTCP sender determines that there are one or more data packets of the MPTCP connection that have not been acknowledged by the MPTCP receiver, method 500 proceeds to step 540. At step 540, the MPTCP sender initiates retransmission, via the MPTCP connection, of the one or more data packets of the MPTCP connection that have not been acknowledged by the MPTCP receiver. The MPTCP sender, for a given data packet of the unacknowledged packets queue, may initiate retransmission of the data packet using a TCP sub-flow of the MPTCP connection that is different than a TCP sub-flow of the MPTCP connection via which the data packet was originally transmitted by the MPTCP sender. At step 599, method 500 ends. It is noted that, in at least some embodiments, steps 510 and 520 of FIG. 5 may be used to provide respective steps 410 and 420 of FIG. 4 or to provide respective steps 310 and 320 of FIG. 3. It is noted that method 500 of FIG. 5 may be further understood by way of reference to FIG. 1 and FIG. 2.

FIG. 6 depicts pseudocode of a method for providing the multipath retransmission capability. The pseudocode 600 of FIG. 6 uses a notation in which mptcp.send_queue corresponds to the send packets queue of the MPTCP sender, mptcp.unack_queue corresponds to the unacknowledged packets queue of the MPTCP sender, and data.subflow corresponds to the TCP sub-flow via which a data packet was sent from the MPTCP sender toward the MPTCP receiver. The lines 1-7 of pseudocode 600 provide a process by which the MPTCP sender sends all of the data packets of the MPTCP connection toward the MPTCP receiver and tracks acknowledgments of data packets of the MPTCP connection by the MPTCP receiver. More specifically, for each data packet of the MPTCP connection, the MPTCP sender selects one of the TCP sub-flows and sends the data packet from the send packets queue (lines 2-5) via the selected one of the TCP sub-flows and puts the data packet into the unacknowledged packets queue (line 6) until receiving an acknowledgement of receipt of the data packet by the MPTCP receiver. The lines 10-16 of pseudocode 600 provide a process by which the MPTCP sender retransmits any data packets of the MPTCP connection that have not been acknowledged by the MPTCP receiver. More specifically, after the last data packet has been sent such that the send packets queue becomes empty (line 7, first condition) and if there is at least one unacknowledged data packet remaining in the unacknowledged packets queue (line 10, second condition), the MPTCP sender retransmits the unacknowledged data packet(s) remaining in the unacknowledged packets queue (lines 11-12). The MPTCP sender avoids retransmitting the unacknowledged data packet(s) on congested TCP sub-flows of the MPTCP connection by, for each of the unacknowledged data packets, retransmitting the respective unacknowledged data packet on a new TCP sub-flow that is different than the initial TCP sub-flow via which the unacknowledged data packet was originally transmitted (lines 13-14). It is noted that pseudocode 600 of FIG. 6 may be further understood by way of reference to FIGS. 1-5.

It is noted that various embodiments of the multicast retransmission capability may improve the performance of various types of data flows. It will be appreciated that, while data flows may be characterized in various ways, transport flows are often characterized as being long flows or short flows where the "length" of a flow may be measured in various ways (e.g., based on the time duration of the flow, the quantity of data transported via the flow, or the like, as well as various combinations thereof). For example, short flows may be defined as having less than 100 KB of data whereas long flows may be defined as having greater than 500 KB of data. For example, short flows may be defined as lasting less than 10 ms whereas long flows may be defined as lasting longer than 1 second. It will be appreciated that flows may be defined in various other ways. It is noted that various embodiments of the multicast retransmission capability may significantly improve the performance of short flows due to the fact that the duration of the short flow is relatively small compared to the duration of timeout conditions, thereby providing a significant reduction in flow completion times for short flows. For example, where a timeout for a short flow of 10 ms is set to 200 ms, use of various embodiments of the multicast retransmission capability to avoid a timeout condition on the short flow will reduce the flow completion time of the short flow from over 200 ms to approximately 10 ms. It is noted that various embodiments of the multicast retransmission capability also may improve the performance of long flows. For example, by improving the performance of short flows (including reducing the number of short flows that experience timeouts), this frees resources that might otherwise be consumed by less efficient handling of short flows (e.g., queuing resources utilized while waiting for timeout conditions on short flows to clear), thereby making those resources available to handle other flows (including short flows and long flows). Accordingly, various embodiments of the multicast retransmission capability may significantly improve the performance of short flows while at least maintaining, and potentially improving, the performance of long flows. It is noted that various embodiments of the multicast retransmission capability also may improve the performance of various other types of data flow which may be defined in various other ways.

It is noted that various embodiments of the multicast retransmission capability may be particularly well-suited for use in datacenter environments. This is at least partially due to the fact that datacenter environments typically include a large number of short flows as well as at least some long flows. This also may be at least partially due to the fact that various embodiments of the multicast retransmission capability may solve the incast congestion problem that is experienced in many datacenter environments. For example, at least some datacenters employ MapReduce datacenter applications for distributed and parallel processing, where, for a given transaction to be performed by a reducer server, a relatively large number of reducer workers (also referred to as mappers) simultaneously transmit their results (short flows) to the reducer server, thereby leading to intermediate switch congestion that can result in packet drops on one or more of the short flows that then cause a delay in the completion of the transaction by the reducer server (commonly referred to as the "incest" congestion problem). It is noted that various embodiments of the multicast retransmission capability, by preventing timeouts on short flows as discussed above, enable efficient completion of transactions that might otherwise be delayed by incast congestion. It will be appreciated that various embodiments of the multicast retransmission capability may provide various other types of improvements in datacenter environments. It will be appreciated various embodiments of the multicast retransmission capability also may be useful within various other types of environments and contexts (at least some of which may not have conditions which make embodiments of multicast retransmission capability useful within datacenter environments).

It is noted that various embodiments of the multicast retransmission capability may provide significant performance improvements over existing multipath technologies. Various embodiments of the multicast retransmission capability were implemented into the Multipath TCP Linux kernel (version 3.16.0) and deployed on a datacenter testbed. The datacenter testbed included two racks where each rack had 15 servers and a ToR switch and all servers were connected to both ToR switches with 1 Gbps links. The packet buffer size per switch port is set to 178 KB. The RTOmin (Retransmission TimeOut) for all protocols was 200 ms. The receive buffer size was set to a sufficiently large number so that TCP flow control did not limit MPTCP flow performance. The measurements were repeated 100 times. The testbed was used to compare the various embodiments of the multicast retransmission capability with each of SPTCP, SPTCP with ECMP, and existing MPTCP. For congestion control, Reno was used for SPTCP and LIA was used for MPTCP and the various embodiments of the multicast retransmission capability. The flow size of each sender was 100 KB. It was observed that, for SPTCP and existing MPTCP, the number of congested flows consistently rose as the number of flows increased. SPTCP clearly showed the worst performance. Existing MPTCP exploited the multiple available paths and performed better than SPTCP, but still suffered from occasional timeouts. It was observed that, while SPTCP with ECMP performed better than SPTCP and existing MPTCP (by distributing the flows on the two paths evenly and, thus, reducing the number of flows for each path) in that SPTCP with ECMP experienced less timeouts as compared to SPTCP and existing MPTCP, use of the various embodiments of the multicast retransmission capability performed even better than SPTCP with ECMP. Namely, it was observed that use of the various embodiments of the multicast retransmission capability, using retransmission of data packets in a manner for preventing timeouts on the flows, significantly reduced the fraction of congested flows (e.g., by about 89.9% as compared to existing MPTCP and by about 79.2% as compared to SPTCP with ECMP). It is noted that various embodiments of the multicast retransmission capability may provide significant performance improvements over existing multipath technologies without requiring any modification to elements disposed between the endpoints of the MPTCP connection (e.g., without requiring ECMP to be installed inside the network, without requiring use of Early Congestion Notification (ECN) in switches in the path, and so forth).

It will be appreciated that, although primarily presented herein with respect to embodiments in which the multipath transport protocol is MPTCP, embodiments presented herein may be adapted for use with various other types of multipath transport protocols supporting multipath delivery of data at the transport layer (e.g., a multipath implementation of the User Datagram Protocol (UDP), a multipath implementation of the Stream Control Transmission Protocol (SCTP), a multipath implementation of the Resource Reservation Protocol (RSVP), or any other suitable multipath transport protocol supporting multipath delivery of data at the transport layer).

Figure 7:
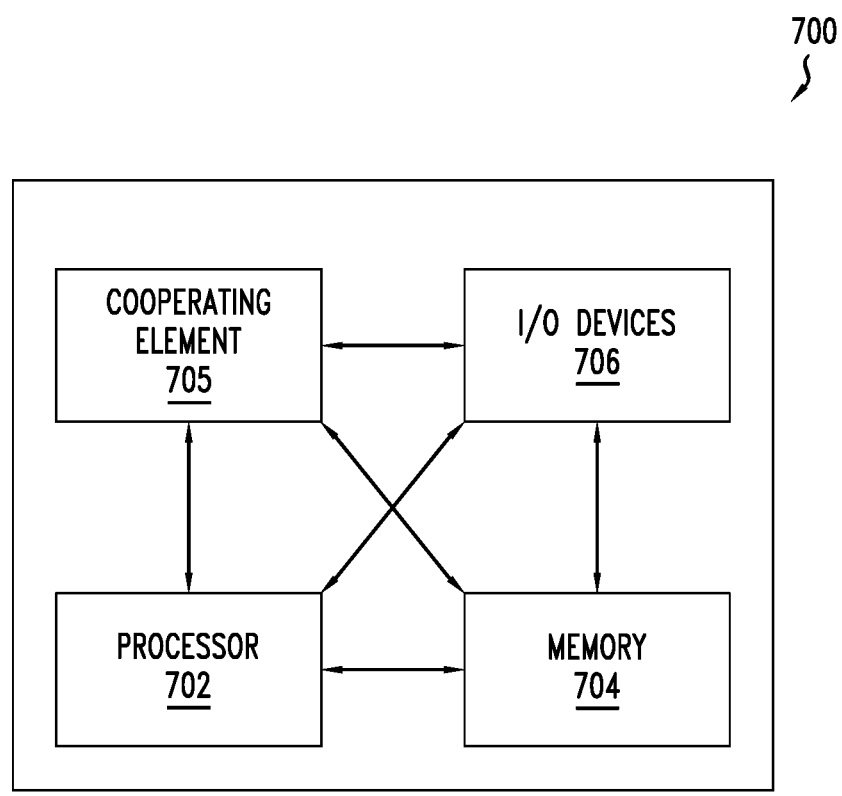
FIG. 7 depicts a high-level block diagram of a computing device suitable for use in performing various functions described herein.

FIG. 7 depicts a high-level block diagram of a computing device suitable for use in performing various functions described herein.

The computer 700 includes a processor 702 (e.g., a central processing unit (CPU), a processor having a set of processor cores, a processor core of a processor, or the like) and a memory 704 (e.g., a random access memory (RAM), a read only memory (ROM), or the like). The processor 702 and the memory 704 are communicatively connected.

The computer 700 also may include a cooperating element 705. The cooperating element 705 may be a hardware device. The cooperating element 705 may be a process that can be loaded into the memory 704 and executed by the processor 702 to implement functions as discussed herein (in which case, for example, the cooperating element 705 (including associated data structures) can be stored on a computer-readable storage medium, such as a storage device or other storage element (e.g., a magnetic drive, an optical drive, or the like)).

The computer 700 also may include one or more input/output devices 706. The input/output devices 706 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices or elements (e.g., a tape drive, a floppy drive, a hard disk drive, a compact disk drive, or the like), or the like, as well as various combinations thereof.

It will be appreciated that computer 700 of FIG. 7 may represent a general architecture and functionality suitable for implementing functional elements described herein, portions of functional elements described herein, or the like, as well as various combinations thereof. For example, computer 700 may provide a general architecture and functionality that is suitable for implementing one or more of a DCD 110, an element of a DCD 110, an element of CN 120, a DCD 210, an element of a DCD 210, an element of CN 220, or the like.

It will be appreciated that the functions depicted and described herein may be implemented in software (e.g., via implementation of software on one or more processors, for executing on a general purpose computer (e.g., via execution by one or more processors) so as to implement a special purpose computer, and the like) and/or may be implemented in hardware (e.g., using a general purpose computer, one or more application specific integrated circuits (ASIC), and/or any other hardware equivalents).

It will be appreciated that at least some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
a processor and a memory communicatively connected to the processor, the processor configured to:
detect, at a multipath sender for a multipath transport connection using a set of transport sub-flows to transport a plurality of data packets toward a multipath receiver, a first condition in which the multipath sender has transmitted each of the data packets toward the multipath receiver via the multipath transport connection and a second condition in which, for one of the data packets transmitted by the multipath sender toward the multipath receiver via a first one of the transport sub-flows, the multipath sender has not received an acknowledgment by the multipath receiver that the one of the data packets was received by the multipath receiver; and
initiate retransmission of the one of the data packets, from the multipath sender toward the multipath receiver via a second one of the transport sub-flows, based on detection of the first condition and the second condition.

2. The apparatus of claim 1, wherein the processor is configured to detect the first condition based on monitoring of a send packets queue of the multipath sender for the multipath transport connection.

3. The apparatus of claim 2, wherein the processor is configured to detect the first condition based on a determination that the send packets queue of the multipath sender for the multipath transport connection is empty.

4. The apparatus of claim 1, wherein the processor is configured to detect the second condition based on monitoring of an unacknowledged packets queue of the multipath sender for the multipath transport connection.

5. The apparatus of claim 4, wherein the processor is configured to detect the second condition based on a determination that the unacknowledged packets queue of the multipath sender for the multipath transport connection is non-empty.

6. The apparatus of claim 1, wherein the processor is configured to detect the first condition based on monitoring of a send packets queue of the multipath sender for the multipath transport connection, wherein the processor is configured to detect the second condition based on monitoring of an unacknowledged packets queue of the multipath sender for the multipath transport connection, wherein the processor is configured to initiate monitoring of the unacknowledged packets queue of the multipath sender for the multipath transport connection based on detection of the first condition.

7. The apparatus of claim 1, wherein the multipath transport connection comprises a Multipath Transmission Control Protocol (TCP) connection and the transport sub-flows comprise TCP sub-flows.

8. A non-transitory computer-readable storage medium storing instructions which, when executed by a processor, cause the processor to perform a method, the method comprising:
  detecting, at a multipath sender for a multipath transport connection using a set of transport sub-flows to transport a plurality of data packets toward a multipath receiver, a first condition in which the multipath sender has transmitted each of the data packets toward the multipath receiver via the multipath transport connection and a second condition in which, for one of the data packets transmitted by the multipath sender toward the multipath receiver via a first one of the transport sub-flows, the multipath sender has not received an acknowledgment by the multipath receiver that the one of the data packets was received by the multipath receiver; and
  initiating retransmission of the one of the data packets, from the multipath sender toward the multipath receiver via a second one of the transport sub-flows, based on detection of the first condition and the second condition.

9. The non-transitory computer-readable storage medium of claim 8, wherein the first condition is detected based on monitoring of a send packets queue of the multipath sender for the multipath transport connection.

10. The non-transitory computer-readable storage medium of claim 9, wherein the first condition is detected based on a determination that the send packets queue of the multipath sender for the multipath transport connection is empty.

11. The non-transitory computer-readable storage medium of claim 8, wherein the second condition is detected based on monitoring of an unacknowledged packets queue of the multipath sender for the multipath transport connection.

12. The non-transitory computer-readable storage medium of claim 11, wherein the second condition is detected based on a determination that the unacknowledged packets queue of the multipath sender for the multipath transport connection is non-empty.

13. The non-transitory computer-readable storage medium of claim 8, wherein the first condition is detected based on monitoring of a send packets queue of the multipath sender for the multipath transport connection and the second condition is detected based on monitoring of an unacknowledged packets queue of the multipath sender for the multipath transport connection, wherein monitoring of the unacknowledged packets queue of the multipath sender for the multipath transport connection is initiated based on detection of the first condition.

14. The non-transitory computer-readable storage medium of claim 8, wherein the multipath transport connection comprises a Multipath Transmission Control Protocol (TCP) connection and the transport sub-flows comprise TCP sub-flows.

15. A method, comprising:
  detecting, at a multipath sender for a multipath transport connection using a set of transport sub-flows to transport a plurality of data packets toward a multipath receiver, a first condition in which the multipath sender has transmitted each of the data packets toward the multipath receiver via the multipath transport connection and a second condition in which, for one of the data packets transmitted by the multipath sender toward the multipath receiver via a first one of the transport sub-flows, the multipath sender has not received an acknowledgment by the multipath receiver that the one of the data packets was received by the multipath receiver; and
  initiating retransmission of the one of the data packets, from the multipath sender toward the multipath receiver via a second one of the transport sub-flows, based on detection of the first condition and the second condition.

16. The method of claim 15, wherein the first condition is detected based on monitoring of a send packets queue of the multipath sender for the multipath transport connection.

17. The method of claim 16, wherein the first condition is detected based on a determination that the send packets queue of the multipath sender for the multipath transport connection is empty.

18. The method of claim 15, wherein the second condition is detected based on monitoring of an unacknowledged packets queue of the multipath sender for the multipath transport connection.

19. The method of claim 18, wherein the second condition is detected based on a determination that the unacknowledged packets queue of the multipath sender for the multipath transport connection is non-empty.

20. The method of claim 15, wherein the first condition is detected based on monitoring of a send packets queue of the multipath sender for the multipath transport connection and the second condition is detected based on monitoring of an unacknowledged packets queue of the multipath sender for the multipath transport connection, wherein monitoring of the unacknowledged packets queue of the multipath sender for the multipath transport connection is initiated based on detection of the first condition.

21. The method of claim 15, wherein the multipath transport connection comprises a Multipath Transmission Control Protocol (TCP) connection and the transport sub-flows comprise TCP sub-flows.

* * * * *